2,736,646

N-1-NAPHTHYLPHTHALAMIC ACID HERBICIDAL COMPOSITIONS

Allen E. Smith, Oxford, Albert W. Feldman, North Haven, and Gracie M. Stone, Naugatuck, Conn., assignors to United States Rubber Company, New York, N. Y., a corporation of New Jersey No Drawing. Application October 27, 1954, Serial No. 465,153

14 Claims. (Cl. 71—2.4)

This invention relates to improvements in N-1-naphthylphthalamic acid herbicidal compositions.

Pre-emergence herbicides are applied to the soil surface before emergence of weeds, generally immediately after planting the seeds of the agronomic crop.

A basis for the action of pre-emergence herbicides is the difference in depth between the planted crop seeds and the weed seeds on the surface of the soil. Crop seeds are generally planted one to three inches deep and are somewhat protected from chemicals applied to the soil surface, while weed seeds generally germinate only in the top one-fourth inch of soil and are thus subject to much higher concentrations of the chemical during the germination period. To maintain as high a concentration of herbicide as possible near the soil surface, and also to avoid injury to the seeded crop which may be semi-sensitive to the herbicide, it is desirable to minimize downward movement of the chemical in the soil during rains or irrigation. Compounds of very low solubility do not necessarily resist leaching. For example, N-1-naphthylphthalamic acid and N-1-naphthyl phthalimide are both substantially insoluble in water (less than 0.05% at 15° C.) yet the acid is quite mobile in soil while the imide resists leaching very well.

The purpose of the present invention is to decrease the soil mobility of phthalamic acid herbicide, in order to increase residual weed control by maintaining a high concentration of the herbicide at the soil surface under wet conditions, and to minimize possible injury to the more deeply seeded crops.

We have found that when water-soluble normal salts of trivalent metals with strong inorganic acids are applied to the soil surface with N-1-naphthylphthalamic acid herbicide, the leaching tendency of the herbicide is greatly decreased. Examples of such salts are aluminum sulfate, aluminum nitrate, ferric chloride.

The amount of water-insoluble trivalent metal salt applied to the soil is not critical, and generally will be at least five times the amount of N-1-naphthylphthalamic acid applied, and may, if desired, be 100 or 1000 times the amount of the N-1-naphthylphthalamic acid as where the salt is added for some secondary purpose. The solubility of the trivalent metal salt may be five or greater percent in water at 15° C. While the trivalent metal salt may be applied to the soil separately from the N-1-naphthylphthalamic acid herbicide, it is preferred to apply it as part of the herbicidal formulation. For example, where the N-1-naphthlyphthalamic acid is applied as an aqueous spray, preferably with the aid of a surface-active dispersing agent to effect dispersion of the phthalamic acid in the water, the trivalent metal salt may be dissolved in the aqueous medium. Where the N-1-naphthylphthalamic acid is applied to the soil as a dust, as in admixture with a powdered solid carrier, such as the various mineral silicates, e. g. talc, pyrophillite and clays, the trivalent metal salt may be incorporated in the powdered formulation. If desired, the N-1-naphthylphthalamic acid and trivalent metal salts may be admixed with powdered solid carriers such as mineral silicates, together with a surface-active dispersing agent so that a readily wettable powder may be obtained which may be applied directly to the soil, or which may be shaken up with water for spray or other liquid application to the soil. The mixture of N-1-naphthylphthalamic acid and trivalent metal salt may be applied to the ground by the aerosol method. Such formulations may, if desired, also contain fertilizers, fungicides, insecticides and soil-conditioners.

The following illustrates the invention. All parts and percentages referred to herein are by weight.

One inch thick layers of a conventional sandy loam soil were placed in several Buchner type funnels. Aqueous dispersions of N-1-naphthylphthalamic acid containing a non-herbicidal surface-active dispersing agent (condensation product of ethylene oxide with an alkylated phenol) were watered onto the surface of the soil in the funnels in amount corresponding to an application rate of about four pounds of N-1-naphthylphthalamic acid per acre. The first dispersion, which was a control or check, contained 0.95 part of N-1-naphthylphthalamic acid and 0.05 part of the dispersing agent in 1000 parts of water. The second and third dispersions contained 0.95 part of N-1-naphthylphthalamic acid and 0.05 part of the dispersing agent, and 30 parts of aluminum sulfate and ferric chloride, respectively, in 1000 parts of water, giving suspensions of the N-1-naphthylphthalamic acid in 3% solutions of the aluminum sulfate and ferric chloride, respectively.

An hour after the treatment of the soil samples with the herbicidal dispersions (the time was found not to be critical), an amount of water equivalent to one inch rainfall was applied to the soil surfaces. The moisture content of the soil was reduced to field capacity by gravity and subsequent vacuum filtration. The filtrates were analyzed chemically to determine the amount of N-1-naphthylphthalamic acid herbicide removed. The percentage of the applied herbicide washed through one inch of soil by one inch of water (i. e. percent leached) was then calculated. The percent of the applied N-1-naphthylphthalamic acid leached in the control dispersion of the herbicide in water was 58%. Other tests have shown that the percent of N-1-naphthylphthalamic acid leached is substantially the same for various application rates of the chemical. With the equivalent of a one-inch rain 50% to 60% of N-1-naphthylphthalamic acid is leached at various application rates from 2 to 8 pounds per acre. With the equivalent of a two-inch rainfall, the percent leaching at 2 to 8 pounds application rate is over 80%. The percent of the applied N-1-naphthylphthalamic acid leached in the dispersions of the herbicide in the 3% solutions of aluminum sulfate and ferric chloride was 6% and 12% respectively. That the improvement is not due to the acid radical, and is not present in the case of normal monovalent or divalent salts or in the case of the water-insoluble hydroxides of the trivalent metals is shown by further similar tests in which the percent of the applied N-1-naphthylphthalamic acid herbicide that was leached where the herbicide was applied dispersed in 3% aqueous solutions of ammonium sulfate and calcium chloride and in 3% aqueous suspension of aluminum hydroxide, was 62%, 56% and 60%, respectively.

Having thus described our invention, what we claim and desire to protect by Letters Patent is:

1. A herbicidal composition containing a phytotoxic concentration of N-1-naphthylphthalamic acid, and a water-soluble normal salt of a trivalent metal with a strong inorganic acid in proportion sufficient to reduce leaching in the soil of said N-1-naphthylphthalamic acid.

2. A herbicidal composition containing a phytotoxic concentration of N-1-naphthylphthalamic acid, and material selected from the group consisting of aluminum sulfate, aluminum nitrate and ferric chloride in proportion sufficient to reduce leaching in the soil of said N-1-naphthylphthalamic acid.

3. A herbicidal composition containing a phytotoxic concentration of N-1-naphthylphthalamic acid, and aluminum sulfate in proportion sufficient to reduce leaching in the soil of said N-1-naphthylphthalamic acid.

4. A herbicidal composition containing a phytotoxic concentration of N-1-naphthylphthalamic acid, and ferric chloride in proportion sufficient to reduce leaching in the soil of said N-1-naphthylphthalamic acid.

5. A herbicidal composition containing a phytotoxic concentration of N-1-naphthylphthalamic acid, and a water-soluble normal salt of a trivalent metal with a strong inorganic acid in proportion sufficient to reduce leaching in the soil of said N-1-naphthylphthalamic acid, said composition containing a surface-active wetting agent.

6. A herbicidal composition containing a phytotoxic concentration of N-1-naphthylphthalamic acid, and a water-soluble normal salt of a trivalent metal with a strong inorganic acid in proportion sufficient to reduce leaching in the soil of said N-1-naphthylphthalamic acid, said composition containing a powdered solid carrier.

7. A herbicidal composition containing a phytotoxic concentration of N-1-naphthylphthalamic acid, and a water-soluble normal salt of a trivalent metal with a strong inorganic acid in proportion sufficient to reduce leaching in the soil of said N-1-naphthylphthalamic acid, said composition containing a surface-active wetting agent and a powdered solid carrier.

8. A herbicidal composition containing a phytotoxic concentration of N-1-naphthylphthalamic acid, and material selected from the group consisting of aluminum sulfate, aluminum nitrate and ferric chloride in proportion sufficient to reduce leaching in the soil of said N-1-naphthylphthalamic acid, said composition containing a surface-active wetting agent.

9. A herbicidal composition containing a phytotoxic concentration of N-1-naphthylphthalamic acid, and material selected from the group consisting of aluminum sulfate, aluminum nitrate and ferric chloride in proportion sufficient to reduce leaching in the soil of said N-1-naphthylphthalamic acid, said composition containing a powdered solid carrier.

10. A herbicidal composition containing a phytotoxic concentration of N-1-naphthylphthalamic acid, and material selected from the group consisting of aluminum sulfate, aluminum nitrate and ferric chloride in proportion sufficient to reduce leaching in the soil of said N-1-naphthylphthalamic acid, said composition containing a surface-active wetting agent and a powdered solid carrier.

11. The method of controlling weeds in soil which comprises treating the soil before emergence of weeds with a phytotoxic amount of N-1-naphthylphthalamic acid and a water-soluble normal salt of a trivalent metal with a strong inorganic acid in proportion sufficient to reduce leaching in the soil of said N-1-naphthylphthalamic acid.

12. The method of controlling weeds in soil which comprises treating the soil before emergence of weeds with a phytotoxic amount of N-1-naphthylphthalamic acid and material selected from the group consisting of aluminum sulfate, aluminum nitrate and ferric chloride in proportion sufficient to reduce leaching in the soil of said N-1-naphthylphthalamic acid.

13. The method of controlling weeds in soil which comprises treating the soil before emergence of weeds with a phytotoxic amount of N-1-naphthylphthalamic acid and aluminum sulfate in proportion sufficient to reduce leaching in the soil of said N-1-naphthylphthalamic acid.

14. The method of controlling weeds in soil which comprises treating the soil before emergence of weeds with a phytotoxic amount of N-1-naphthylphthalamic acid and ferric chloride in proportion sufficient to reduce leaching in the soil of said N-1-naphthylphthalamic acid.

References Cited in the file of this patent

UNITED STATES PATENTS 2,556,665   Smith _____ June 12, 1951

FOREIGN PATENTS 705,824   Great Britain _____ Mar. 17, 1954